US012613567B2

(12) United States Patent
Xiong

(10) Patent No.: US 12,613,567 B2
(45) Date of Patent: Apr. 28, 2026

(54) POWER CONSUMPTION CONTROL IN MEMORY SYSTEMS

(71) Applicant: Yangtze Memory Technologies Co., Ltd., Hubei (CN)

(72) Inventor: Tao Xiong, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 94 days.

(21) Appl. No.: 18/482,723

(22) Filed: Oct. 6, 2023

(65) Prior Publication Data

US 2025/0085766 A1 Mar. 13, 2025

Related U.S. Application Data

(63) Continuation of application No. PCT/CN2023/118420, filed on Sep. 13, 2023.

(51) Int. Cl.
| | |
|---|---|
| *G06F 1/00* | (2006.01) |
| *G06F 1/3234* | (2019.01) |
| *G06F 1/3296* | (2019.01) |

(52) U.S. Cl.
CPC .......... *G06F 1/3275* (2013.01); *G06F 1/3296* (2013.01)

(58) Field of Classification Search
CPC .............................. G06F 1/3296; G06F 1/3275
See application file for complete search history.

(56) References Cited

U.S. PATENT DOCUMENTS

| | | | | |
|---|---|---|---|---|
| 10,936,046 B2 * | 3/2021 | Chao | ..................... | G06F 1/3275 |
| 10,936,049 B2 * | 3/2021 | Mocanu | ................ | G06F 3/0604 |

| | | | | |
|---|---|---|---|---|
| 2007/0016725 A1 * | 1/2007 | Chu | ...................... | G06F 3/0679 |
| | | | | 711/113 |
| 2010/0274953 A1 | 10/2010 | Lee et al. | | |
| 2011/0260783 A1 * | 10/2011 | Kawasaki | ............... | G06F 1/324 |
| | | | | 327/540 |
| 2013/0097433 A1 | 4/2013 | Boorman et al. | | |
| 2015/0194969 A1 * | 7/2015 | Kawabe | ................ | G06F 1/3243 |
| | | | | 327/114 |
| 2015/0293788 A1 * | 10/2015 | Pires Dos Reis Moreira | ............. | |
| | | | | G06F 9/4893 |
| | | | | 718/102 |
| 2017/0366412 A1 * | 12/2017 | Piga | .................... | H04L 67/1008 |
| 2020/0186588 A1 * | 6/2020 | Xu | ...................... | H04L 67/1038 |
| 2023/0205306 A1 * | 6/2023 | Greathouse | .......... | G06F 1/3296 |
| | | | | 713/320 |

(Continued)

FOREIGN PATENT DOCUMENTS

| | | |
|---|---|---|
| CN | 102498480 | 6/2012 |
| CN | 103576833 | 2/2014 |

(Continued)

OTHER PUBLICATIONS

International Search Report and Written Opinion in International Appln. No. PCT/CN2023/118420, mailed on Dec. 21, 2023, 8 pages.

*Primary Examiner* — Mohammed H Rehman

(74) *Attorney, Agent, or Firm* — Fish & Richardson P.C.

(57) ABSTRACT

Example memory systems, methods, and controllers for reducing power consumption in memory systems are disclosed. One example method includes determining, by a controller of a memory system and based on multiple commands received by the memory system during a first period of time, that a condition is met. A frequency or a voltage applied to one or more processors of the controller is reduced by the controller in response to determining that the condition is met.

20 Claims, 6 Drawing Sheets

(56) References Cited

U.S. PATENT DOCUMENTS

2024/0202003 A1* 6/2024 Chajdas ................ G06F 9/3836

FOREIGN PATENT DOCUMENTS

| CN | 105487814 | 4/2016 |
| CN | 106662979 | 5/2017 |
| CN | 109558071 | 4/2019 |
| CN | 110580095 | 12/2019 |

* cited by examiner

400

402 —
DETERMINE THAT CONDITIONS ARE MET
TO CHANGE A CORE FREQUENCY OR A
CORE VOLTAGE APPLIED TO ONE OR
MORE PROCESSORS OF A MEMORY
CONTROLLER IN A MEMORY SYSTEM

404 —
CHANGE THE CORE FREQUENCY TO A
TARGET FREQUENCY OR THE CORE VOLTAGE
TO A TARGET VOLTAGE AFTER DETERMINING
THAT CONDITIONS ARE MET TO CHANGE THE
CORE FREQUENCY OR THE CORE VOLTAGE

600

602 — DETERMINE, BY A CONTROLLER OF A MEMORY SYSTEM AND BASED ON MULTIPLE COMMANDS RECEIVED BY THE MEMORY SYSTEM DURING A FIRST PERIOD OF TIME, THAT A CONDITION IS MET

604 — REDUCE, BY THE CONTROLLER, A FREQUENCY OR A VOLTAGE APPLIED TO ONE OR MORE PROCESSORS OF THE CONTROLLER IN RESPONSE TO DETERMINING THAT THE CONDITION IS MET

POWER CONSUMPTION CONTROL IN MEMORY SYSTEMS

CROSS-REFERENCE TO RELATED APPLICATIONS

This application is a continuation of International Application No. PCT/CN2023/118420, filed on Sep. 13, 2023, the disclosure of which is hereby incorporated by reference in its entirety.

TECHNICAL FIELD

The present disclosure relates to memory devices, memory systems, and methods for power consumption control in a flash memory.

BACKGROUND

Flash memory is a low-cost, high-density, nonvolatile solid-state storage medium that can be electrically erased and reprogrammed. Flash memory includes NOR flash memory and NAND flash memory. Various operations can be performed by a flash memory, for example, program (write) or read operations. Operations performed by a flash memory can affect power consumption of the flash memory.

SUMMARY

The present disclosure relates to memory systems, methods, and controllers for reducing power consumption in memory systems. One example method includes determining, by a controller of a memory system and based on multiple commands received by the memory system during a first period of time, that a condition is met. A frequency or a voltage applied to one or more processors of the controller is reduced by the controller in response to determining that the condition is met.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

This specification relates to memory systems, methods, and controllers for reducing power consumption in memory systems. In some cases, memory devices in a memory system, for example, NAND flash memory devices, can perform operations including sequential read and sequential write of data. Sequential read or write operation of a memory device is an operation in which data are sequentially read from or written to the memory device. Power consumption of a memory system due to sequential read or sequential write operations of the memory devices in the memory system can increase as the speed of sequential read or sequential write operation increases. To avoid excessive power consumption during sequential read or sequential write operations, a memory controller of a memory system that controls the memory devices in the memory system can change the core frequency or core voltage applied to processors of the memory controller in order to reduce the power consumption of the memory system, while maintaining high speed of the sequential read or sequential write operation. Changing the core frequency or the core voltage can also help avoid excessive temperature of the memory devices during the sequential read or sequential write operation.

Figure 1:
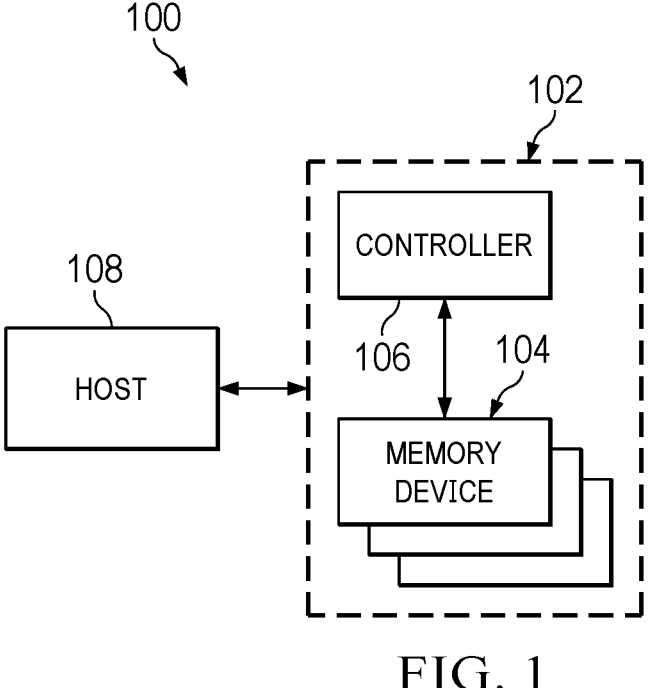
FIG. 1 illustrates a block diagram of an example system having a memory device, according to some aspects of the present disclosure.

FIG. 1 illustrates a block diagram of an example system 100 having a memory device, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data to or from memory devices 104.

Memory device 104 can be any memory device disclosed in the present disclosure. Memory controller 106 is coupled to memory device 104 and host 108 and is configured to control memory device 104, according to some implementations. Memory controller 106 can manage the data stored in memory device 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid-state drives (SSDs) or embedded multi-media-cards (eMMCs) used as data storage for mobile devices, such as smartphones, tablets, laptop computers, etc., and enterprise storage arrays. Memory controller 106 can be configured to control operations of memory device 104, such as read, erase, and program operations. Memory controller 106 can also be configured to manage various functions with respect to the data stored or to be stored in memory device 104 including, but not limited to bad-block management, garbage collection, logical-to-physical address conversion, wear leveling, etc. In some implementations, memory controller 106 is further configured to process error correction codes (ECCs) with respect to the data read from or written to memory device 104. Any other suitable functions may be performed by memory controller 106 as well, for example, formatting memory device 104.

Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products. In some implementations, memory system 102 can be implemented and packaged into SSDs such as client SSDs or enterprise SSDs. Client SSDs can be used in electronic devices such as personal computers, digital cameras, smart phones, mobile devices, etc. Enterprise SSDs can be used in enterprise environments such as data centers or servers.

Figure 2:
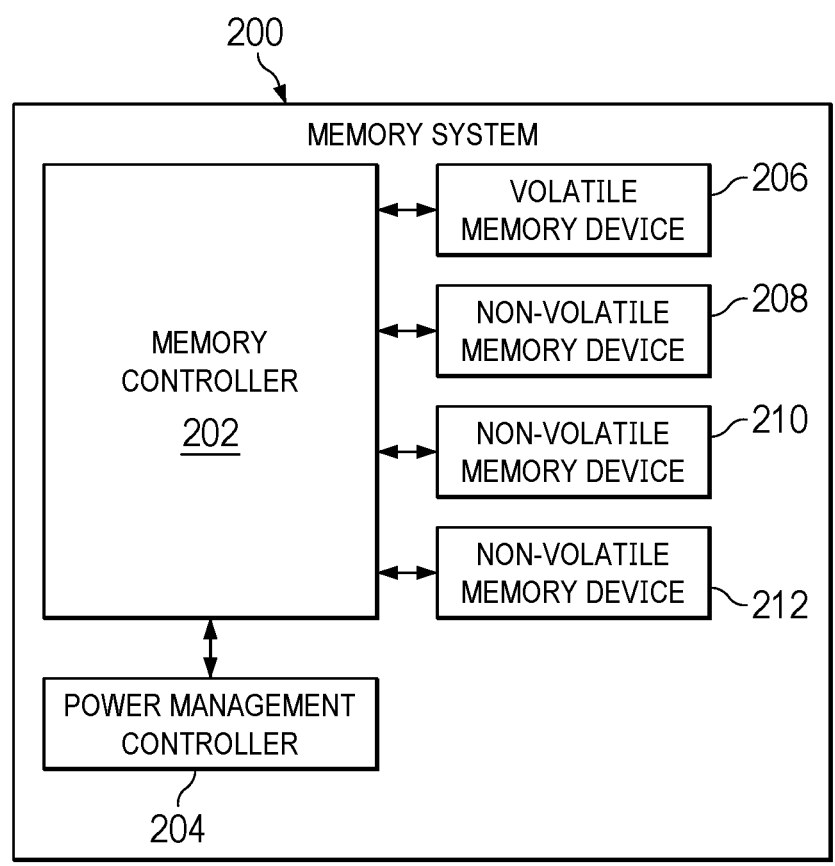
FIG. 2 illustrates a diagram of an example memory system, according to some aspects of the present disclosure.

FIG. 2 illustrates a diagram of an example memory system 200. Memory system 200 includes memory controller 202, volatile memory device 206, non-volatile memory devices 208, 210, and 212, and power management controller 204. Memory controller 202 is described in more detail in FIG. 3. Memory controller 202 is coupled to volatile memory device 206, non-volatile memory devices 208, 210, and 212, and power management controller 204. In some implementations, volatile memory device 206 can be used to cache data that memory controller 202 can access. In some implementations, memory device 206 can be non-volatile memory devices.

Figure 4:
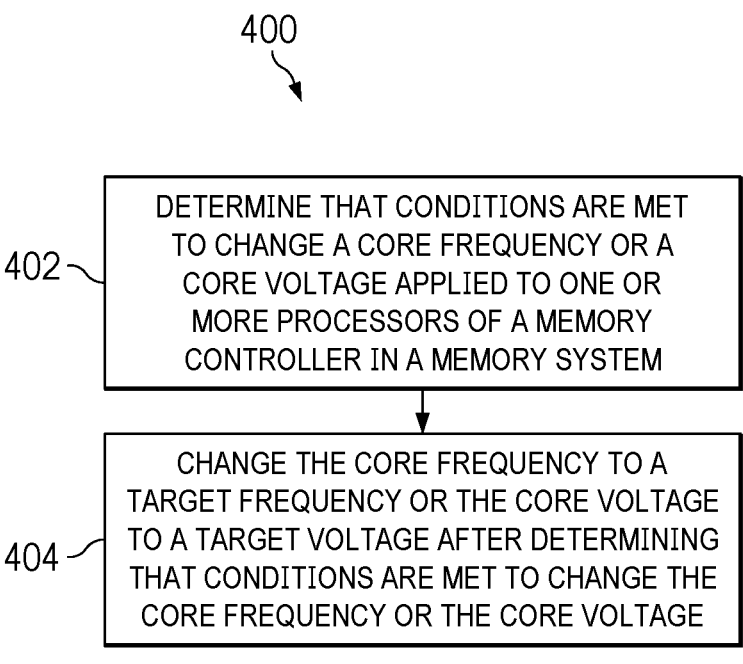
FIG. 4 illustrates an example workflow of changing core frequency or core voltage applied to processors of a memory controller in a memory system, according to some aspects of the present disclosure.

In some implementations, memory controller 202 controls operations performed by non-volatile memory devices 208, 210, and 212. Example operations can include sequential read operation, sequential write operation, idle operation, and other operations. Other operations can include random read operation and random write operation. Memory controller 202 can change the core frequency or the core voltage applied to the processors in memory controller 202. FIG. 4 shows an example workflow of changing core frequency or core voltage applied to processors of a memory controller in a memory system.

In some implementations, memory controller 202 can send commands to power management controller 204 such that power management controller 204 can change the core voltage applied to the processors in memory controller 202.

Figure 3:
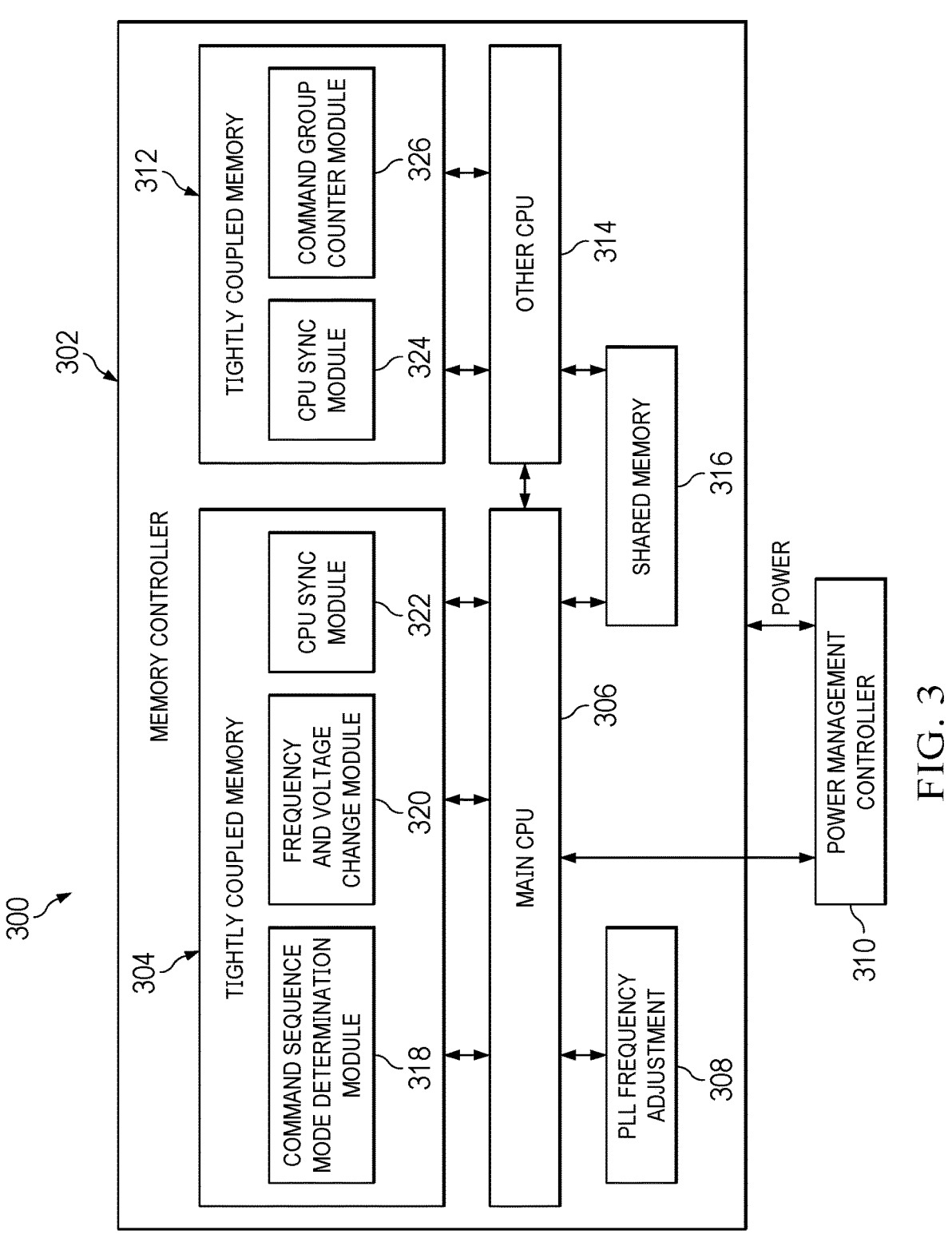
FIG. 3 illustrates a diagram of an example memory controller coupled to a power management controller, according to some aspects of the present disclosure.

FIG. 3 illustrates a diagram 300 of an example memory controller coupled to a power management controller. Memory controller 302 can correspond to memory controller 202 in FIG. 2. Memory controller 302 includes tightly coupled memories 304 and 312, main CPU 306, other CPU 314, shared memory 316, and phase lock loop (PLL) frequency adjustment module 308. Main CPU 306 and other CPU 314 are processors in memory controller 302 to support operations of memory devices controlled by memory controller 302. Other CPU 314 can include one or more secondary CPUs that are controlled by main CPU 306. Memory controller 302 is coupled to power management controller 310. Tightly coupled memory 304 is coupled to main CPU 306, and tightly coupled memory 312 is coupled to other CPU 314. Tightly coupled memory 304 includes command sequence mode determination module 318, frequency and voltage change module 320, and CPU sync module 322. Tightly coupled memory 312 includes CPU sync module 324 and command group counter module 326.

In some implementations, command sequence mode determination module 318 can determine command sequence mode associated with main CPU 306. Command sequence mode can include sequential read mode, sequential write mode, idle mode, and other mode. In sequential read mode, main CPU 306 supports sequential read operations of memory devices controlled by memory controller 302. In sequential write mode, main CPU 306 supports sequential write operations of memory devices controlled by memory controller 302. In idle mode, main CPU 306 supports idle operations of memory devices controlled by memory controller 302, where main CPU 306 receives no commands or a small number of commands from a host. In other mode, main CPU 306 supports other operations of memory devices controlled by memory controller 302. Examples of other operations can include random read and random write operations.

In some implementations, frequency and voltage change module 320 can change the core frequency or the core voltage applied to main CPU 306 and other CPU 314. CPU sync module 322 can perform synchronization operations for main CPU 306, where main CPU 306 finishes its current command and wait for main CPU 306 and other CPU 314 to complete core frequency change or core voltage change, before continues to process new commands or tasks.

In some implementations, CPU sync module 324 can perform synchronization operations for other CPU 314, where other CPU 314 finishes its current command and wait for main CPU 306 and other CPU 314 to complete core frequency change or core voltage change, before continues to process new commands or tasks.

In some implementations, command group counter module 326 can count and monitor the number of commands associated with each command sequence mode and received by memory controller 302 during a specific period of time. Main CPU 306 can use the monitored number of commands associated with each command sequence mode to determine when to change the core frequency or the core voltage applied to main CPU 306 and other CPU 314.

In some implementations, main CPU 306 can control PLL frequency adjustment module 308 that is coupled to main CPU 306 in order to change the core frequency applied to main CPU 306 and other CPU 314. Shared memory 316 is coupled to both main CPU 306 and other CPU 314 to store data shared between main CPU 306 and other CPU 314.

In some implementations, main CPU 306 can control power management controller 310 that is coupled to main CPU 306 in order to change the core voltage applied to main CPU 306 and other CPU 314. Power management controller 310 can correspond to power management controller 204 in FIG. 2. Main CPU 306 can send commands to power management controller 310 such that power management controller 310 can change the core voltage applied to main CPU 306 and other CPU 314.

FIG. 4 illustrates an example workflow 400 of changing core frequency or core voltage applied to processors of a memory controller in a memory system.

At 402, a main processor of a memory controller in a memory system determines that conditions are met to change a core frequency or a core voltage applied to one or more processors of the memory controller. In some implementations, the memory controller, for example, memory controller 302 in FIG. 3, can be a system on a chip (SOC). The one or more processors can include a main processor, for example, main CPU 306 in FIG. 3, and one or more secondary processors, for example, other CPU 314 in FIG. 3.

In some implementations, to determine if the conditions are met, first the main processor monitors the number of commands the memory controller receives during a period of time (e.g., first period of time) for sequential read, for example, sequential read command with 128 KB command size, and the number of commands it receives for sequential write, for example, sequential write command with 128 KB command size, respectively. For example, the period of time can be one second.

In some implementations, if the monitored number of sequential read commands the memory controller receives during the period of time is greater than a read threshold, then the main processor determines that the conditions are met to change the core frequency or the core voltage applied to the one or more processors of the memory controller. The core frequency or the core voltage can be reduced to a target frequency or a target voltage respectively to reduce the power consumption associated with the read and/or write operations of memory devices controlled by the memory controller.

In some implementations, if the monitored number of sequential write commands the memory controller receives during the period of time is greater than a write threshold, then the main processor determines that the conditions are met to change the core frequency or the core voltage applied to the one or more processors of the memory controller. The core frequency or the core voltage can be reduced to a target frequency or a target voltage respectively to reduce the power consumption associated with the read and/or write operations of memory devices controlled by the memory controller.

In some implementations, if the combined monitored number of sequential write commands and the monitored number of sequential write commands the memory controller receives during the period of time is greater than a total threshold, then the main processor determines that the conditions are met to change the core frequency or the core voltage applied to the one or more processors of the memory controller. The core frequency or the core voltage can be reduced to a target frequency or a target voltage respectively to reduce the power consumption associated with the read and/or write operations of memory devices controlled by the memory controller.

In some implementations, the read threshold, the write threshold, or the total threshold can be predetermined based on the read or write performance that the main processor can support without incurring excessive power consumption of the memory system. For example, the core frequency applied to the main CPU is 800 MHz, and the read performance that the main processor can support is 30% of the maximum read speed of 14 GB per second. Then the read threshold can be set to 14 GB*0.3/(128*1024), which is about 32000 commands in 1 second. As another example, the write performance that the main processor can support is 30% of the maximum write speed of 10 GB per second. Then the read threshold can be set to 10 GB*0.3/(128*1024), which is about 23000 commands in 1 second.

In some implementations, to avoid excessive number of frequency changes or voltage changes within a specific period of time, the main processor can also monitor a delay time duration (e.g., second period of time) as an additional condition for determining whether to change the core frequency or the core voltage. For example, if a time period equivalent to the delay time duration has not elapsed since the core frequency or the core voltage has changed last time, the main processor will not change either the core frequency or the core voltage, even though the conditions have been met. If the conditions are met after a time period equivalent to the delay time duration has elapsed since the core frequency or the core voltage has changed last time, the main processor can change the core frequency or the core voltage.

In some implementations, the main processor can also check the garbage collection state of each memory device controlled by the memory controller as another condition for determining whether to change the core frequency or the core voltage. For example, during the garbage collection process of a memory device controlled by the memory controller, the main processor can increase the core frequency or the core voltage, regardless of whether the other conditions described above are met. As another example, if none of the memory devices controlled by the memory controller is in garbage collection state, the main processor can determine whether to change the core frequency or the core voltage based on the other conditions described above.

In some implementations, if the main processor determines that the memory devices controlled by the memory controller are not in any one of sequential read mode, sequential write mode, or garbage collection mode, the main processor does not change the core frequency and the core voltage.

At 404, the main processor changes the core frequency to a target frequency or the core voltage to a target voltage after determining that conditions are met to change the core frequency or the core voltage. In some implementations, the target frequency and the target voltage can be predetermined based on testing and calculation. For example, the target frequency can be predetermined such that the read and write performance of a memory device controlled by the memory controller, e.g., a SSD, is not affected by the target frequency. The target frequency can be a frequency that is lower than the core frequency. In another example, the target voltage can be predetermined such that the target voltage can support the stability of the memory device controlled by the memory controller.

Table 1 below includes examples of the target frequencies and the target voltages for different input/output (I/O) command sequence cases. The example target frequencies and the target voltages can be further adjusted based on testing of the read and write performance of the memory device controlled by the memory controller.

TABLE 1

| Command sequence case | Target frequency (MHz) | Target voltage (V) | Target frequency selection rule | Target voltage selection rule |
|---|---|---|---|---|
| Sequential read | 800 | 0.78 | The target | The target voltage |
| Sequential write | 800 | 0.78 | frequency | supports the |
| Idle | 400 | 0.76 | supports the | stability of the |
| Other | 1200 | 0.8 | performance | memory device, |

TABLE 1-continued

| Command sequence case | Target frequency (MHz) | Target voltage (V) | Target frequency selection rule | Target voltage selection rule |
|---|---|---|---|---|
| | | | of sequential read of 14 GB/s or sequential write of 10 GB/s. | for example, error free performance of 30 memory devices during testing of 168 hours for each memory device. |

In some implementations, to change the core frequency to the target frequency or the core voltage to the target voltage, first each of the one or more processors can perform a synchronization operation. During the synchronization operation, each processor can first finish processing its current command, then wait for the process of changing frequency and voltage to complete for the processor. This waiting state of each of the one or more processors can be a common designated state. The code for each processor to perform the synchronization operation can be stored in a tightly coupled memory, for example, tightly coupled memory 304 for main CPU 306 or tightly coupled memory 312 for other CPU 314 in FIG. 3.

In some implementations, after each CPU finishes processing its current command during the synchronization operation, the main processor can change the core frequency to the target frequency by modifying the phase lock loop (PLL) register, e.g., PLL frequency adjustment module 308 in FIG. 3. The target frequency can be lower than the core frequency to reduce the power consumption associated with the read and/or write operations of memory devices controlled by the memory controller.

In some implementations, after reducing the core frequency, the main processor can change the core voltage to the target voltage by sending a corresponding command to the power management integrated circuit (PMIC) for voltage change. The target voltage can be lower than the core voltage to reduce the power consumption associated with the read and/or write operations of memory devices controlled by the memory controller.

In some implementations, after the main processor changes both the core frequency and the core voltage, each CPU can exit the synchronization function, and then continue to process new tasks.

Figure 5:
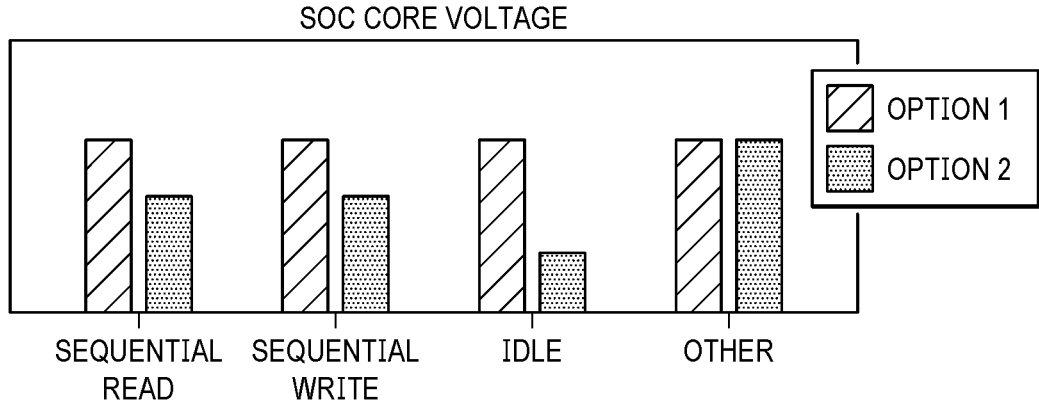
FIG. 5 illustrates an example of changes in power consumption associated with different memory device operations after changes in core frequency and core voltage, according to some aspects of the present disclosure.
Figure 5:
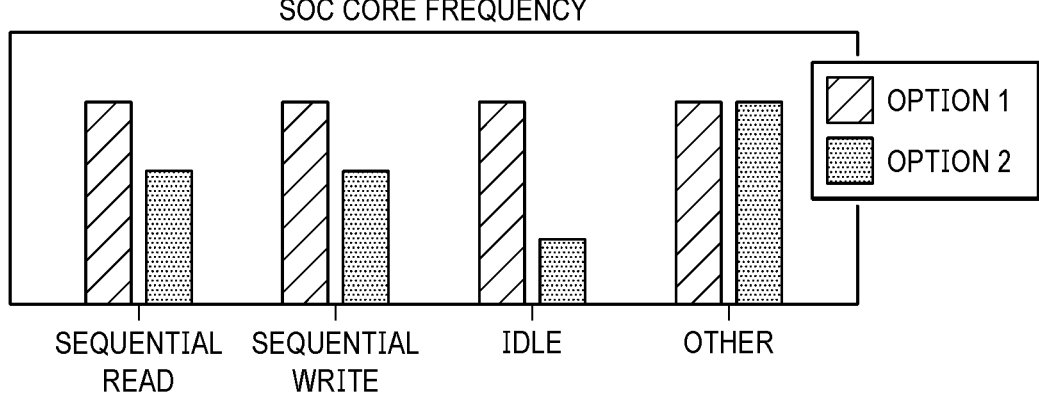
Figure 5:
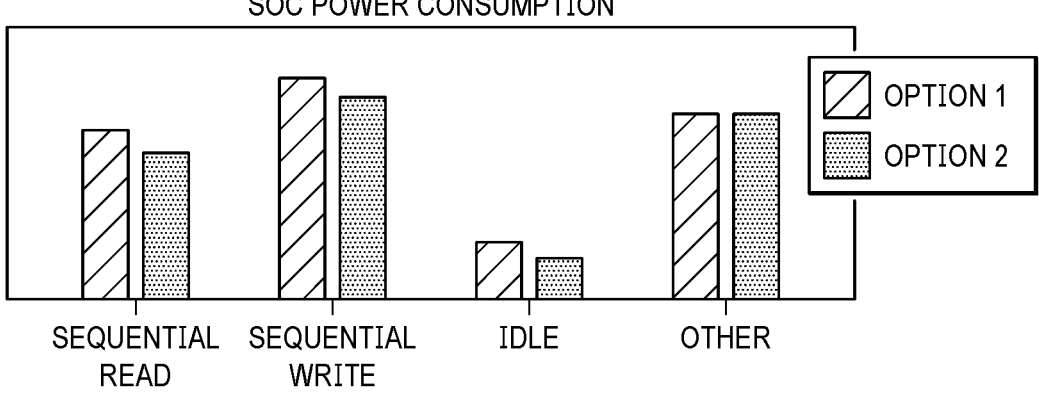
Figure 6:
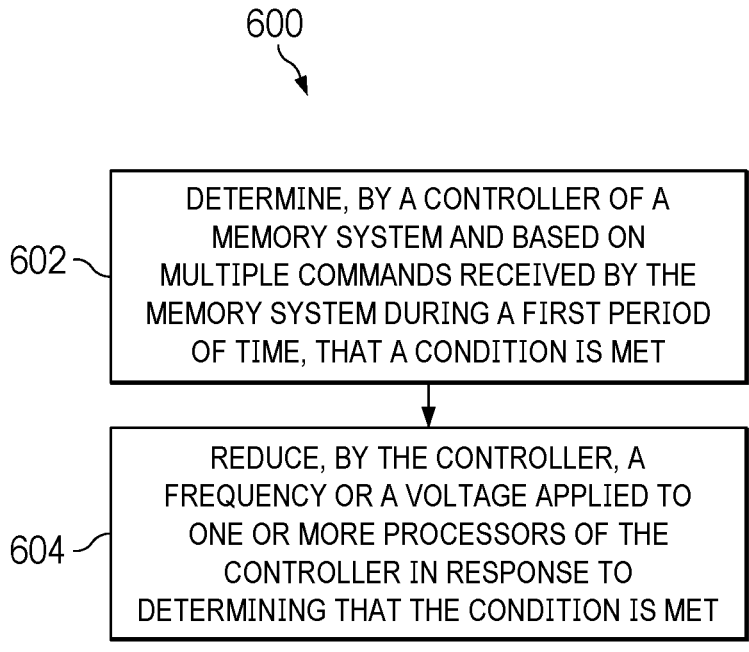
FIG. 6 illustrates an example of a flow chart of a method for reducing power consumption in a memory system, according to some aspects of the present disclosure.

FIG. 5 illustrates an example of changes in power consumption associated with different memory device operations after changes in core frequency and core voltage. For the sequential read operations in the example, the SOC core voltage changes from 0.8V to 0.78V, the SOC core frequency changes from 1200 MHz to 800 MHz, and as a result, the SOC power consumption changes from 18 W to 16 W. For the sequential write operations in the example, the SOC core voltage changes from 0.8V to 0.78V, the SOC core frequency changes from 1200 MHz to 800 MHz, and as a result, the SOC power consumption changes from 24 W to 22 W. For the idle operations in the example, the SOC core voltage changes from 0.8V to 0.76V, the SOC core frequency changes from 1200 MHz to 400 MHz, and as a result, the SOC power consumption changes from 6 W to 4 W. For the other operations in the example, the SOC core voltage and SOC core frequency are not changes, and consequently the SOC power consumption is not changed. FIG. 6 illustrates an example 600 of a flow chart of a method for reducing power consumption in a memory system, according to some aspects of the present disclosure. At 602, a controller of a memory system determines, based on multiple commands received by the memory system during a first period of time, that a condition is met.

At 604, the controller reduces a frequency or a voltage applied to one or more processors of the controller in response to determining that the condition is met.

Certain aspects of the subject matter described here can be implemented as a memory system. The memory system includes a memory device and a controller coupled to the memory device and configured to perform operations including determining, based on multiple commands received by the memory system during a first period of time, that a condition is met, and reducing a frequency or a voltage applied to one or more processors of the controller in response to determining that the condition is met.

The memory system can include one or more of the following features.

In some implementations, the multiple commands include at least one of sequential write commands or sequential read commands.

In some implementations, the operations further include determining that a second period of time has elapsed since the frequency or the voltage applied to the one or more processors of the controller was reduced last time, and reducing the frequency or the voltage applied to the one or more processors of the controller includes reducing the frequency or the voltage applied to the one or more processors of the controller in response to determining that the condition is met and the second period of time has elapsed since the frequency or the voltage applied to the one or more processors of the controller was reduced last time.

In some implementations, reducing the frequency or the voltage applied to the one or more processors of the controller includes reducing the frequency applied to the one or more processors of the controller followed by reducing the voltage applied to the one or more processors of the controller.

In some implementations, the first period of time is immediately preceding a time instant when the frequency or the voltage applied to the one or more processors of the controller is reduced.

In some implementations, the memory system is in a sequential write mode, a sequential read mode, or an idle mode.

In some implementations, before reducing the frequency or the voltage applied to the one or more processors of the controller, the operations further include in response to determining that the condition is met, completing all current tasks of the one or more processors, and synchronizing each of the one or more processors to a common designated state.

In some implementations, after reducing the frequency or the voltage applied to the one or more processors of the controller, the operations further include performing new tasks on the one or more processors.

In some implementations, reducing the frequency applied to the one or more processors includes reducing the frequency applied to the one or more processors using a phase-locked loop (PLL) register in the controller.

In some implementations, the one or more processors include a main processor and one or more secondary processors, the memory system further includes a power management integrated circuit (PMIC) coupled to the controller, and reducing the voltage applied to the one or more processors includes determining, by the main processor, one or more commands based on multiple parameters monitored by the one or more processors, and sending, by the main processor, the one or more commands to the PMIC to reduce the voltage applied to the one or more processors.

In some implementations, before reducing the frequency or the voltage applied to the one or more processors of the controller, the operations further include determining that the memory system is not in garbage collection mode, and reducing the frequency or the voltage applied to the one or more processors of the controller includes reducing the frequency or the voltage applied to the one or more processors of the controller in response to determining that the condition is met and the memory system is not in garbage collection.

In some implementations, the condition includes that a quantity of the multiple commands received by the memory system during the first period of time is more than a threshold, a ratio of the threshold to the first period of time is larger than or equal to 32000, and the first period of time is longer than or equal to one second.

Certain aspects of the subject matter described here can be implemented as a method. The method includes determining, by a controller of a memory system and based on multiple commands received by the memory system during a first period of time, that a condition is met. A frequency or a voltage applied to one or more processors of the controller is reduced by the controller in response to determining that the condition is met.

The method can include one or more of the following features.

In some implementations, the multiple commands include at least one of sequential write commands or sequential read commands.

In some implementations, the method further includes determining that a second period of time has elapsed since the frequency or the voltage applied to the one or more processors of the controller was reduced last time, and reducing the frequency or the voltage applied to the one or more processors of the controller includes reducing the frequency or the voltage applied to the one or more processors of the controller in response to determining that the condition is met and the second period of time has elapsed since the frequency or the voltage applied to the one or more processors of the controller was reduced last time.

In some implementations, reducing the frequency or the voltage applied to the one or more processors of the controller includes reducing the frequency applied to the one or more processors of the controller followed by reducing the voltage applied to the one or more processors of the controller.

In some implementations, before reducing the frequency or the voltage applied to the one or more processors of the controller, the method further includes in response to determining that the condition is met, completing all current tasks of the one or more processors, and synchronizing each of the one or more processors to a common designated state.

In some implementations, after reducing the frequency or the voltage applied to the one or more processors of the controller, the method further includes performing new tasks on the one or more processors.

In some implementations, reducing the frequency applied to the one or more processors includes reducing the frequency applied to the one or more processors using a phase-locked loop (PLL) register in the controller.

In some implementations, the one or more processors include a main processor and one or more secondary processors, the memory system further includes a power management integrated circuit (PMIC) coupled to the controller, and reducing the voltage applied to the one or more processors includes determining, by the main processor, one or more commands based on multiple parameters monitored by the one or more processors, and sending, by the main processor, the one or more commands to the PMIC to reduce the voltage applied to the one or more processors.

In some implementations, before reducing the frequency or the voltage applied to the one or more processors of the controller, the method further includes determining that the memory system is not in garbage collection mode, and reducing the frequency or the voltage applied to the one or more processors of the controller includes reducing the frequency or the voltage applied to the one or more processors of the controller in response to determining that the condition is met and the memory system is not in garbage collection.

In some implementations, the condition includes that a quantity of the multiple commands received by the memory system during the first period of time is more than a threshold, a ratio of the threshold to the first period of time is larger than or equal to 32000, and the first period of time is longer than or equal to one second.

Certain aspects of the subject matter described here can be implemented as a controller of a memory system. The controller is configured to perform operations including determining, by the controller and based on multiple commands received by the memory system during a first period of time, that a condition is met, and reducing, by the controller, a frequency or a voltage applied to one or more processors of the controller in response to determining that the condition is met.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multi-tasking or parallel processing (or a combination of multi-tasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A memory system, comprising:
a memory device; and
a controller coupled to the memory device and configured to perform operations comprising:
determining, based on a plurality of commands received by the memory system during a first period of time, that a condition is met, wherein the condition comprises that a quantity of the plurality of commands received by the memory system during the first period of time is more than a threshold; and
reducing a frequency or a voltage applied to one or more processors of the controller in response to determining that the condition is met, wherein reducing the frequency applied to the one or more processors of the controller comprises reducing the frequency to a non-zero frequency,
wherein, before reducing the frequency or the voltage applied to the one or more processors of the controller, the operations further comprise:
in response to determining that the condition is met:
completing current tasks of the one or more processors; and
synchronizing each of the one or more processors to a common designated state.

2. The memory system according to claim 1, wherein the plurality of commands comprise at least one of sequential write commands or sequential read commands.

3. The memory system according to claim 1, wherein the operations further comprise:
determining that a second period of time has elapsed since the frequency or the voltage applied to the one or more processors of the controller was reduced last time; and
wherein reducing the frequency or the voltage applied to the one or more processors of the controller comprises:
reducing the frequency or the voltage applied to the one or more processors of the controller in response to determining that the condition is met and the second period of time has elapsed since the frequency or the voltage applied to the one or more processors of the controller was reduced last time.

4. The memory system according to claim 1, wherein reducing the frequency or the voltage applied to the one or more processors of the controller comprises reducing the frequency applied to the one or more processors of the controller followed by reducing the voltage applied to the one or more processors of the controller.

5. The memory system according to claim 1, wherein the first period of time is immediately preceding a time instant when the frequency or the voltage applied to the one or more processors of the controller is reduced.

6. The memory system according to claim 1, wherein the memory system is in a sequential write mode, a sequential read mode, or an idle mode.

7. The memory system according to claim 1, wherein after reducing the frequency or the voltage applied to the one or more processors of the controller, the operations further comprise:
performing new tasks on the one or more processors.

8. The memory system according to claim 1, wherein reducing the frequency applied to the one or more processors comprises reducing the frequency applied to the one or more processors using a phase-locked loop (PLL) register in the controller.

9. The memory system according to claim 1, wherein the one or more processors comprise a main processor and one or more secondary processors, the memory system further comprises a power management integrated circuit (PMIC) coupled to the controller, and wherein reducing the voltage applied to the one or more processors comprises:
determining, by the main processor, one or more commands based on a plurality of parameters monitored by the one or more processors; and
sending, by the main processor, the one or more commands to the PMIC to reduce the voltage applied to the one or more processors.

10. The memory system according to claim 1, wherein before reducing the frequency or the voltage applied to the one or more processors of the controller, the operations further comprise:
determining that the memory system is not in garbage collection mode; and
wherein reducing the frequency or the voltage applied to the one or more processors of the controller comprises:
reducing the frequency or the voltage applied to the one or more processors of the controller in response to determining that the condition is met and the memory system is not in garbage collection.

11. The memory system according to claim 1, wherein the condition further comprises that a ratio of the threshold to the first period of time is larger than or equal to 32000, and the first period of time is longer than or equal to one second.

12. A method, comprising:
determining, by a controller of a memory system and based on a plurality of commands received by the memory system during a first period of time, that a condition is met, wherein the condition comprises that a quantity of the plurality of commands received by the memory system during the first period of time is more than a threshold; and reducing, by the controller, a frequency or a voltage applied to one or more processors of the controller in response to determining that the condition is met, wherein reducing the frequency applied to the one or more processors of the controller comprises reducing the frequency to a non-zero frequency, and wherein, before reducing the frequency or the voltage applied to the one or more processors of the controller, the method further comprises:

in response to determining that the condition is met:

completing current tasks of the one or more processors; and synchronizing each of the one or more processors to a common designated state.

13. The method according to claim 12, wherein the plurality of commands comprise at least one of sequential write commands or sequential read commands.

14. The method according to claim 12, further comprising:

determining that a second period of time has elapsed since the frequency or the voltage applied to the one or more processors of the controller was reduced last time; and wherein reducing the frequency or the voltage applied to the one or more processors of the controller comprises:

reducing the frequency or the voltage applied to the one or more processors of the controller in response to determining that the condition is met and the second period of time has elapsed since the frequency or the voltage applied to the one or more processors of the controller was reduced last time.

15. The method according to claim 12, wherein reducing the frequency or the voltage applied to the one or more processors of the controller comprises reducing the frequency applied to the one or more processors of the controller followed by reducing the voltage applied to the one or more processors of the controller.

16. The method according to claim 12, wherein the one or more processors comprise a main processor and one or more secondary processors, the memory system further comprises a power management integrated circuit (PMIC) coupled to the controller, and wherein reducing the voltage applied to the one or more processors comprises:

determining, by the main processor, one or more commands based on a plurality of parameters monitored by the one or more processors; and sending, by the main processor, the one or more commands to the PMIC to reduce the voltage applied to the one or more processors.

17. The method according to claim 12, wherein before reducing the frequency or the voltage applied to the one or more processors of the controller, the method further comprises:

determining that the memory system is not in garbage collection mode; and wherein reducing the frequency or the voltage applied to the one or more processors of the controller comprises:

reducing the frequency or the voltage applied to the one or more processors of the controller in response to determining that the condition is met and the memory system is not in garbage collection.

18. A controller of a memory system, wherein the controller is configured to perform operations comprising:

determining, by the controller and based on a plurality of commands received by the memory system during a first period of time, that a condition is met, wherein the condition comprises that a quantity of the plurality of commands received by the memory system during the first period of time is more than a threshold; and reducing, by the controller, a frequency or a voltage applied to one or more processors of the controller in response to determining that the condition is met, wherein reducing the frequency applied to the one or more processors of the controller comprises reducing the frequency to a non-zero frequency, and wherein, before reducing the frequency or the voltage applied to the one or more processors of the controller, the operations further comprise:

in response to determining that the condition is met:

completing current tasks of the one or more processors; and synchronizing each of the one or more processors to a common designated state.

19. The controller according to claim 18, wherein the operations further comprise:

determining that a second period of time has elapsed since the frequency or the voltage applied to the one or more processors of the controller was reduced last time; and wherein reducing the frequency or the voltage applied to the one or more processors of the controller comprises:

reducing the frequency or the voltage applied to the one or more processors of the controller in response to determining that the condition is met and the second period of time has elapsed since the frequency or the voltage applied to the one or more processors of the controller was reduced last time.

20. The controller according to claim 18, wherein reducing the frequency or the voltage applied to the one or more processors of the controller comprises reducing the frequency applied to the one or more processors of the controller followed by reducing the voltage applied to the one or more processors of the controller.

* * * * *